United States Patent
Xiang et al.

(10) Patent No.: US 11,354,256 B2
(45) Date of Patent: Jun. 7, 2022

(54) MULTI-CORE INTERCONNECTION BUS, INTER-CORE COMMUNICATION METHOD, AND MULTI-CORE PROCESSOR

(71) Applicant: Alibaba Group Holding Limited, Grand Cayman (KY)

(72) Inventors: Xiaoyan Xiang, Shanghai (CN); Taotao Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 85 days.

(21) Appl. No.: 17/021,527

(22) Filed: Sep. 15, 2020

(65) Prior Publication Data

US 2021/0089479 A1    Mar. 25, 2021

(30) Foreign Application Priority Data

Sep. 25, 2019 (CN) .......................... 201910913359.0

(51) Int. Cl.
*G06F 13/16* (2006.01)
*G06F 12/08* (2016.01)
*G06F 13/40* (2006.01)
*G06F 12/0884* (2016.01)

(52) U.S. Cl.
CPC ...... *G06F 13/1668* (2013.01); *G06F 12/0884* (2013.01); *G06F 13/4068* (2013.01); *G06F 2212/603* (2013.01)

(58) Field of Classification Search
CPC ............. G06F 13/1668; G06F 12/0884; G06F 13/4068; G06F 2212/603
USPC .......................................................... 710/308
See application file for complete search history.

(56) References Cited

U.S. PATENT DOCUMENTS

| 2010/0211744 | A1* | 8/2010 | Morrow | G06F 12/0808 711/146 |
|---|---|---|---|---|
| 2013/0254488 | A1* | 9/2013 | Kaxiras | G06F 12/0815 711/130 |
| 2013/0332672 | A1* | 12/2013 | Busaba | G06F 12/12 711/108 |

(Continued)

*Primary Examiner* — Christopher B Shin

(57) ABSTRACT

The present invention discloses a multi-core interconnection bus, including a request transceiver module adapted to receive a data request from a processor core, and forward the data request to a snoop and caching module through a request execution module, where the data request includes a request address; the snoop and caching module adapted to look up cache data validity information of the request address, acquire data from a shared cache, and sequentially return the cache data validity information and the data acquired from the shared cache to the request execution module; and the request execution module adapted to determine, based on the cache data validity information, a target processor core whose local cache stores valid data, forward the data request to the target processor core, and receive returned data; and determine response data from the data returned by the target processor core and that returned by the snoop and caching module, and return, through the request transceiver module, the response data to the processor core that initiates the data request. The present invention also discloses a corresponding inter-core communication method and a multi-core processor.

20 Claims, 7 Drawing Sheets

(56) References Cited

U.S. PATENT DOCUMENTS

| | | | |
|---|---|---|---|
| 2015/0012711 A1* | 1/2015 | Garg | G06F 12/084 |
| | | | 711/130 |
| 2015/0106567 A1 | 4/2015 | Godard et al. | |
| 2018/0004663 A1* | 1/2018 | Jalal | G06F 12/0831 |
| 2018/0074960 A1* | 3/2018 | Raz | G06F 12/0875 |
| 2018/0365149 A1* | 12/2018 | Zoellin | G06F 12/0833 |
| 2018/0373541 A1* | 12/2018 | Ros | G06F 12/0891 |
| 2019/0018772 A1* | 1/2019 | Hinrichs | G06F 12/0862 |
| 2019/0102303 A1 | 4/2019 | Wang et al. | |
| 2021/0089479 A1* | 3/2021 | Xiang | G06F 13/1668 |
| 2021/0357327 A1* | 11/2021 | Zhu | G06F 11/073 |

* cited by examiner

MULTI-CORE INTERCONNECTION BUS, INTER-CORE COMMUNICATION METHOD, AND MULTI-CORE PROCESSOR

CROSS-REFERENCE TO RELATED APPLICATIONS

This application claims the benefit of Chinese Patent Application No. 201910913359.0 filed Sep. 25, 2019, which is incorporated herein in its entirety.

TECHNICAL FIELD

The present invention relates to the field of processor technologies, and in particular, to a multi-core interconnection bus capable of implementing efficient inter-core communication, an inter-core communication method based on the multi-core interconnection bus, a multi-core processor including the multi-core interconnection bus, a system-on-chip, and an intelligent device.

BACKGROUND OF THE INVENTION

Modern processors adopt a multi-core architecture in most cases to improve a parallel task processing capability of the processors. Permission to access data in a memory may vary between processor cores of a multi-core processor. In the memory, an address that can be accessed by a plurality of processor cores is a shared address, and an address that can be accessed only by a given processor core is a non-shared address.

An access speed of the memory does not actually match an execution speed of the processor (the former is lower than the latter). At present, a caching mechanism is usually used to balance the access speed of the memory and the execution speed of the processor. That is, a low-capacity cache (Cache) is disposed in the processor to cache data in a slow and low-cost memory (Memory). The multi-core processor usually includes multi-level caches. For example, a local cache is disposed inside each processor core, and data in the local cache can be accessed only by the processor core in which the local cache is located. A shared cache for a plurality of processor cores is coupled on a multi-core interconnection bus outside the processor cores. Data in the shared cache can be accessed by the plurality of processor cores.

When a processor core initiates a data request specific to a shared address, the multi-core interconnection bus first forwards the data request to the processor cores, and the processor cores access their local caches and return data to the multi-core interconnection bus. If the data returned by all the processor cores is invalid, the shared cache is then accessed. If data returned by the shared cache is also invalid, a lower-level storage unit (a lower-level cache or memory) is further accessed. In this method, the local cache is first accessed and then the shared cache is accessed, resulting in a long access latency and performance loss.

Therefore, it is necessary to provide a low-latency and efficient inter-core communication method and a multi-core interconnection bus.

SUMMARY OF THE INVENTION

In view of this, the present invention provides a multi-core interconnection bus, an inter-core communication method, and a multi-core processor, so as to resolve or at least alleviate the foregoing problems.

According to a first aspect of the present invention, a multi-core interconnection bus is provided, including a request transceiver module, coupled to a processor core and a request execution module, and adapted to receive a data request from the processor core and forward the data request to a snoop and caching module through the request execution module, where the data request includes a request address; the snoop and caching module adapted to look up cache data validity information of the request address, acquire data from a shared cache, and sequentially return the cache data validity information and the data acquired from the shared cache to the request execution module; and the request execution module adapted to determine, based on the cache data validity information, a target processor core whose local cache stores valid data, forward the data request to the target processor core, and receive data returned by the target processor core; and determine response data from the data returned by the target processor core and that returned by the snoop and caching module, and return, through the request transceiver module, the response data to the processor core that initiates the data request.

Optionally, in the multi-core interconnection bus according to the present invention, the request execution module is further adapted to determine whether the request address is a shared address; and when the request address is a shared address, forward the data request to the snoop and caching module; or when the request address is not a shared address, access a lower-level storage unit coupled to the request execution module to acquire the response data.

Optionally, in the multi-core interconnection bus according to the present invention, the cache data validity information is adapted to determine whether there is valid data stored in local caches of processor cores and the shared cache.

Optionally, in the multi-core interconnection bus according to the present invention, the cache data validity information includes a shared-cache validity bit and a plurality of local-cache validity bits; the shared-cache validity bit is adapted to identify validity of data in the shared cache; and the plurality of local-cache validity bits are adapted to identify validity of data in local caches of a plurality of processor cores.

Optionally, in the multi-core interconnection bus according to the present invention, the snoop and caching module stores at least one address array, and the address array includes cache data validity information corresponding to a plurality of addresses; and the snoop and caching module is further adapted to: compare the request address with addresses in the address array, to determine the cache data validity information of the request address.

Optionally, in the multi-core interconnection bus according to the present invention, the snoop and caching module is further adapted to: when the cache data validity information of the request address is not found, return a lookup miss message to the request execution module, so that the request execution module accesses the lower-level storage unit coupled to the request execution module to acquire the response data.

Optionally, in the multi-core interconnection bus according to the present invention, the snoop and caching module is further adapted to: determine, based on the cache data validity information, whether there is valid data stored in the shared cache; and when there is valid data stored in the shared cache, acquire the data from the shared cache and return the acquired data to the request execution module.

Optionally, in the multi-core interconnection bus according to the present invention, the request execution module is further adapted to: receive the data returned by the target processor core and a validity tag of the data; and when the received data that is returned by the target processor core is valid, use the valid data as the response data.

Optionally, in the multi-core interconnection bus according to the present invention, the request execution module is further adapted to: if data returned by all target processor cores is invalid, use the data returned by the snoop and caching module as the response data.

Optionally, in the multi-core interconnection bus according to the present invention, the snoop and caching module is further adapted to: skip access to the shared cache when there is no valid data stored in the shared cache.

Optionally, in the multi-core interconnection bus according to the present invention, the request execution module is further adapted to: if data returned by all target processor cores is invalid, access a lower-level storage unit coupled to the request execution module to acquire the response data.

Optionally, in the multi-core interconnection bus according to the present invention, when the cache data validity information stored in the snoop and caching module is consistent with current real data validity tags of processor cores, the snoop and caching module is further adapted to: when the cache data validity information indicates that there is at least one target processor core whose local cache stores valid data, send the data validity information to the request execution module, so that the request execution module determines a target processor core whose local cache stores valid data, and forwards the data request to the target processor core; and skip access to the shared cache. The request execution module is further adapted to use the data returned by the target processor core as the response data.

Optionally, in the multi-core interconnection bus according to the present invention, the snoop and caching module is further adapted to: when the cache data validity information indicates that there is no valid data in any local caches of the processor cores and there is valid data stored in the shared cache, acquire the data from the shared cache and send the acquired data to the request execution module; and the request execution module is further adapted to use the data returned by the snoop and caching module as the response data.

According to a second aspect of the present invention, an inter-core communication method is provided, including the following steps: receiving a data request coming from a processor core and forwarded by a request execution module, where the data request includes a request address; and looking up cache data validity information of the request address, acquiring data from a shared cache, and sequentially returning the cache data validity information and the data acquired from the shared cache to the request execution module, so that the request execution module: determines, based on the cache data validity information, a target processor core whose local cache stores valid data, forwards the data request to the target processor core, receives data returned by the target processor core, determines response data from the data returned by the target processor core and the data acquired from the shared cache, and returns the response data to the processor core that initiates the data request.

According to a third aspect of the present invention, a multi-core processor is provided, including a plurality of processor cores and the multi-core interconnection bus described above.

According to a fourth aspect of the present invention, a system-on-chip is provided, including the multi-core processor as described above.

According to a fifth aspect of the present invention, an intelligent device is provided, including the system-on-chip as described above.

According to the technical solutions of the present invention, the multi-core interconnection bus includes the snoop and caching module, and the snoop and caching module stores the cache data validity information of the plurality of addresses. After the request transceiver module receives the data request containing the request address and sent by the processor core, the snoop and caching module looks up the cache data validity information of the request address, and sends the cache data validity information to the request execution module, so that the request execution module determines the target processor core whose local cache stores valid data, and forwards the data request to the target processor core. At the same time, if there is valid data stored in the shared cache, the snoop and caching module further acquires the data from the shared cache and sends the acquired data to the request execution module. The request execution module determines the response data from the data returned by the target processor core and the data that is acquired from the shared cache and returned by the snoop and caching module, and returns, through the request transceiver module, the response data to the processor core that initiates the data request.

The snoop and caching module in the present invention uses a two-stage returning mechanism for returning information to the request execution module. During first-stage returning, the snoop and caching module returns the cache data validity information of the request address to the request execution module, so that the request execution module can determine, based on the cache data validity information, the target processor core whose local cache stores valid data, and immediately forward the data request to the target processor core. During second-stage returning, the snoop and caching module returns the data of the shared cache to the request execution module. Based on the two-stage returning mechanism, a process of forwarding the data request to the target processor core by the request execution module to access the local cache of the target processor core can be performed in parallel with a process of accessing the shared cache by the snoop and caching module. Compared with the prior-art technical solution of first accessing the local cache and then accessing the shared cache, in the present invention, an access latency is greatly reduced and an inter-core data communication speed is improved.

In addition, in the technical solutions of the present invention, both cache data validity information of addresses (namely, an address array) and data in the shared cache (namely, a data array) are stored only once, thereby avoiding repeated storage of the addresses and the cache data validity information and effectively saving a storage space.

The foregoing description is merely an overview of the technical solutions of the present invention. In order to better understand the technical means of the present invention to implement the technical means based on content of the specification, and to make the above and other objects, features and advantages of the present invention more comprehensible, the following describes specific embodiments of the present invention.

BRIEF DESCRIPTION OF THE DRAWINGS

In order to achieve the above and related objectives, some descriptive aspects are described herein in combination with the following description with reference to the accompanying drawings. These aspects indicate various ways in which the principles disclosed herein can be practiced, and all aspects and their equivalent aspects are intended to fall within the scope of the subject to be protected. The above and other objectives, features and advantages of the present disclosure will become more apparent by reading the following detailed description with reference to the accompanying drawings. Throughout the present disclosure, the same reference numeral generally represents the same part or element.

DETAILED DESCRIPTION OF THE INVENTION

Figure 1:
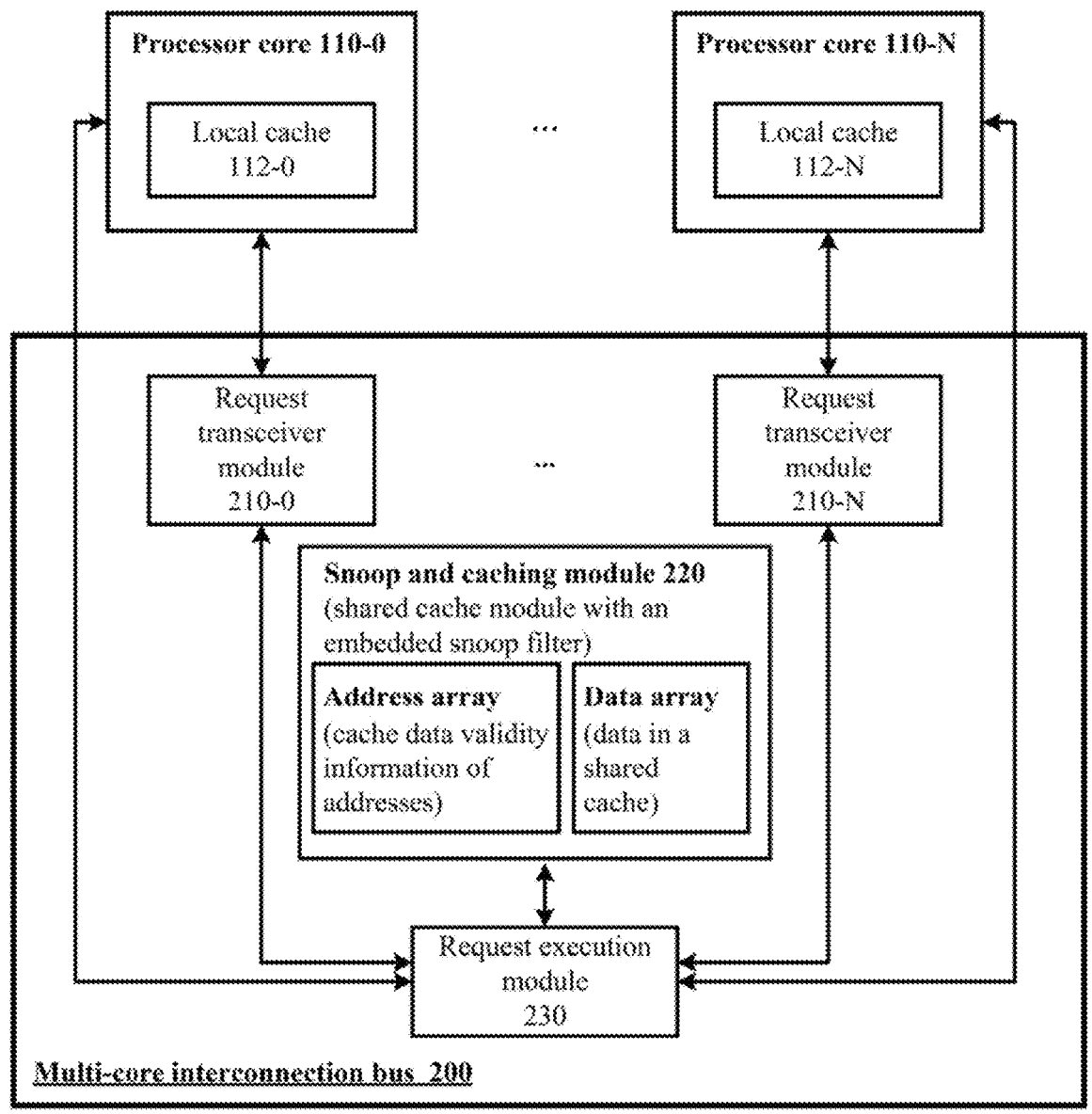
FIG. 1 illustrates a schematic diagram of a multi-core processor according to one embodiment of the present invention.

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be fully conveyed to those skilled in the art.

In the prior art, when a processor core of a multi-core processor initiates a data request specific to a shared address, a multi-core interconnection bus first forwards the data request to processor cores, and the processor cores access their local caches and return data to the multi-core interconnection bus. If the data returned by all the processor cores is invalid, the shared cache is then accessed. If data returned by the shared cache is also invalid, a lower-level storage unit (a lower-level cache or memory) is further accessed.

In some improved solutions, a snoop filter (Snoop Filter) is disposed in the multi-core processor, and the snoop filter is used to record validity of data in the local caches of the processor cores. When a processor core of the multi-core processor initiates a data request specific to a shared address, the multi-core interconnection bus first accesses the snoop filter to determine whether there is valid data in the local caches of the processor cores, and then requests data only from a processor core storing valid data, thereby avoiding unnecessary bus-based transmission and reducing transmission blocking. If the data returned by all the processor cores is invalid, the shared cache is then accessed. If data returned by the shared cache is also invalid, a lower-level storage unit is further accessed.

In the prior art, regardless of whether the snoop filter is disposed in the multi-core interconnection bus, for a data request specific to the shared address and initiated by the processor core, the local caches of the processor cores are always accessed first, and then the shared cache is accessed, resulting in a long access latency and a great performance loss.

In addition, when the snoop filter is disposed, the snoop filter and the shared cache are two independent modules, both of which need to store address information and data validity information (data corresponding to addresses also needs to be stored in the shared cache). Repeated storage of the address information and the data validity information needs to occupy a relatively large storage space, thereby increasing costs of hardware resources.

To resolve the foregoing problems in the prior art, the present invention provides a multi-core interconnection bus and an inter-core communication method based on the multi-core interconnection bus, so as to implement low-latency and efficient inter-core communication. In addition, this can also avoid a storage space waste caused by repeated storage of the address information and the data validity information, and save the hardware resources.

FIG. 1 illustrates a schematic diagram of a multi-core processor 100 according to one embodiment of the present invention. As shown in FIG. 1, the multi-core processor 100 includes a plurality of processor cores 110 (110-0 to 110-N) and a multi-core interconnection bus 200. The multi-core interconnection bus 200 is coupled to each processor core 110, and is configured to implement inter-core communication between the processor cores.

As shown in FIG. 1, each processor core 110 includes a local cache 112, and data in the local cache can be accessed only by the processor core 110 in which the local cache is located. The multi-core interconnection bus 200 includes a shared cache, and data in the shared cache can be accessed by the plurality of processor cores 110 (sometimes by all the processor cores 110). In this embodiment of the present invention, the shared cache of the multi-core interconnection bus 200 is implemented in a snoop and caching module 220. The snoop and caching module 220 is a shared cache module with an embedded snoop filter. Functions and processing logic of the snoop and caching module 220 are described in detail below.

Figure 2A:
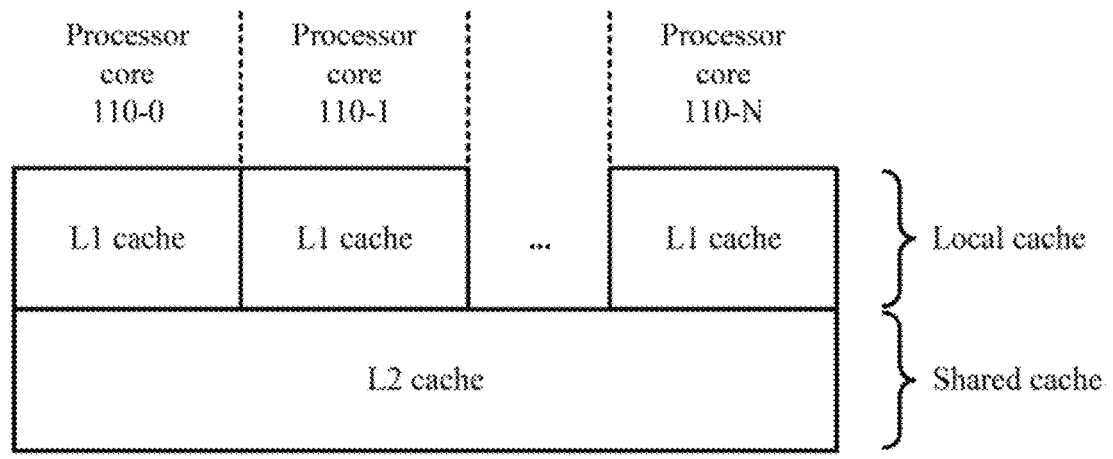
FIG. 2A and FIG. 2B illustrate schematic structural diagrams of local caches of a plurality of processing cores and a shared cache according to two embodiments of the present invention.
Figure 2B:
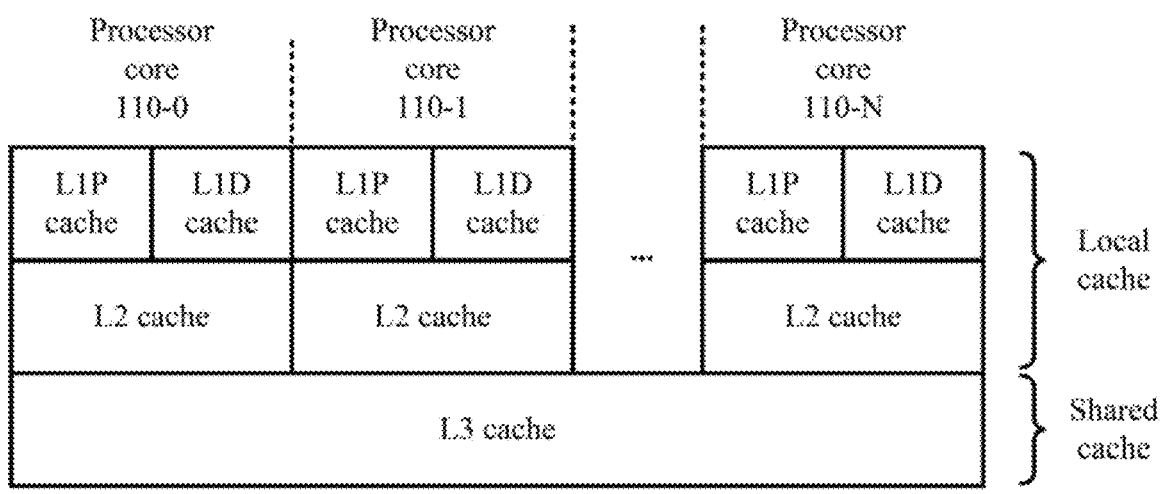

It should be noted that the present invention does not impose a limitation on specific structures of the local cache and the shared cache. Any local caches located inside the processor cores and any shared cache that is located outside the processor cores and that can be accessed by the plurality of processor cores fall within the protection scope of the present invention. FIG. 2A and FIG. 2B illustrate examples of two types of structures of a local cache and a shared cache.

As shown in FIG. 2A, the local cache of each processor core 110 includes only an L1 (level-1) cache, and a shared cache of the processor cores is an L2 (level-2) cache. A lower-level storage unit of the shared cache may be an L3 (level-3) cache or memory (memory).

As shown in FIG. 2B, a local cache of each processor core 110 consists of two levels of caches, namely L1D and L2 caches. The L1D cache further includes an L1P cache for caching instructions and an L1D cache for caching data. The shared cache of the processor cores is an L3 (level-3) cache. A lower-level storage unit of the shared cache can be a memory. A person skilled in the art can understand that a multi-level cache structure with an L4 (level-4) cache, an L5 (level-5) cache and so on is uncommon; however, if the L4 and L5 caches are present, these caches are also lower-level storage units of the L3 cache.

In addition, it should be noted that the present invention does not impose a limitation on a data relationship between the local cache and the shared cache and any data relationship falls within the protection scope of the present invention. Actually, the data relationship between the local cache and the shared cache is related to a preset hierarchical caching policy. In some embodiments, data in the local cache is a subset of data in the shared cache, that is, the local cache stores data of some addresses, and the shared cache also surely stores the data of these addresses (however, validity of the data may be different). In some other embodiments, the data in the local caches and the data in the shared cache are mutually exclusive. To be specific, the local caches store data of some addresses, but the shared cache may not necessarily store the data of such addresses. In still other embodiments, the data in the local cache intersects with the data in the shared cache, that is, the data of some addresses in the local cache is also present in the shared cache (however, validity of the data may be different) while data of other addresses in the local cache is not present in the shared cache.

Because all the plurality of processor cores 110 can perform an operation on data of a shared address, the data of the shared address may have a duplicate in the local caches 112 of the plurality of processor cores 110. If a processor core modifies the data of the shared address, the data may become inconsistent between the plurality of cores. Therefore, data consistency needs to be maintained between the plurality of processor cores. Each processor core 110 further includes a cache controller 113 (the cache controller 113 is not shown in FIG. 1) that is configured to maintain cache data consistency between the plurality of processors according to a preset cache consistency protocol. Specifically, the cache controller monitors a cache operation performed on another processor core to determine whether data cached in the processor core 110 in which the cache controller is located is valid, and stores a data validity tag. The cache consistency protocol may be, but not limited to, the MESI (Modified Exclusive Shared or Invalid) protocol.

In some embodiments, the cache controller 113 may further determine whether data cached in other processor cores 110 is valid by monitoring a cache operation performed on the other processor cores, and store data validity tags of the other processor cores 110. A person skilled in the art can understand that monitoring and storing data validity of the other processor cores 110 by the cache controller 113 increases transmission pressure of the multi-core interconnection bus 200 and occupies a storage space of the local cache 112. Preferably, a switching component may be disposed in the processor core 110. A person skilled in the art may control the switching component to enable or disable, depending on an actual requirement, a function of monitoring and storing the data validity of the other processor cores 110 by the cache controller 113. For example, the switching component may be one register in the processor core 110. An on/off state of the foregoing function is controlled by writing a different value to the register.

As shown in FIG. 1, the multi-core interconnection bus 200 includes a plurality of request transceiver modules 210 (210-0 to 210-N), a snoop and caching module 220, and a request execution module 230.

The request transceiver module 210 is coupled to the processor core 110, and is configured to receive a data request (Request) from the processor core 110 and return the response data (Response) to the corresponding processor core 110. In the embodiment shown in FIG. 1, a quantity of request transceiver modules 210 included in the multi-core interconnection bus 200 is the same as a quantity of processor cores 110 included in the multi-core processor 100, that is, each processor core 110 corresponds to one request transceiver module 210. A person skilled in the art can understand that in other embodiments, the quantity of request transceiver modules 210 may alternatively be different from the quantity of processor cores 110, and one request transceiver module 210 may correspond to a plurality of processor cores 110.

The snoop and caching module 220 is a shared cache module with an embedded snoop filter. The snoop and caching module 220 includes a cache control unit (the cache control unit is not shown in FIG. 1), an address array, and a data array. The address array stores cache data validity information corresponding to a plurality of addresses, and can be used to implement a function of the snoop filter. The data array is an array formed by data in the shared cache. The cache control unit is configured to maintain data consistency between the shared cache and the local caches of the processor cores, monitor an operation performed on the local caches of the processor cores to determine validity of the data in the local caches and the shared cache, update the cache data validity information in the address array, and update the data in the data array. It should be noted that, according to a different control mechanism of the cache control unit, the cache data validity information in the address array can be probably consistent or inconsistent with current real data validity tags of the processor cores.

The request execution module 230 is coupled to the request transceiver module 210, the snoop and caching module 220, the processor cores 110, and a lower-level storage unit (a lower-level storage unit is not shown in FIG. 1). The request execution module 230 is adapted to receive a data request acquired from the processor core 110 and forwarded by the request transceiver module 210, acquire data from the processor core 110, the snoop and caching module 220, or the lower-level storage unit (lower-level storage unit), determine the response data of the data request from the acquired data, and return, through the request transceiver module 210, the response data to the processor core 110 that initiates the data request.

Figure 3:
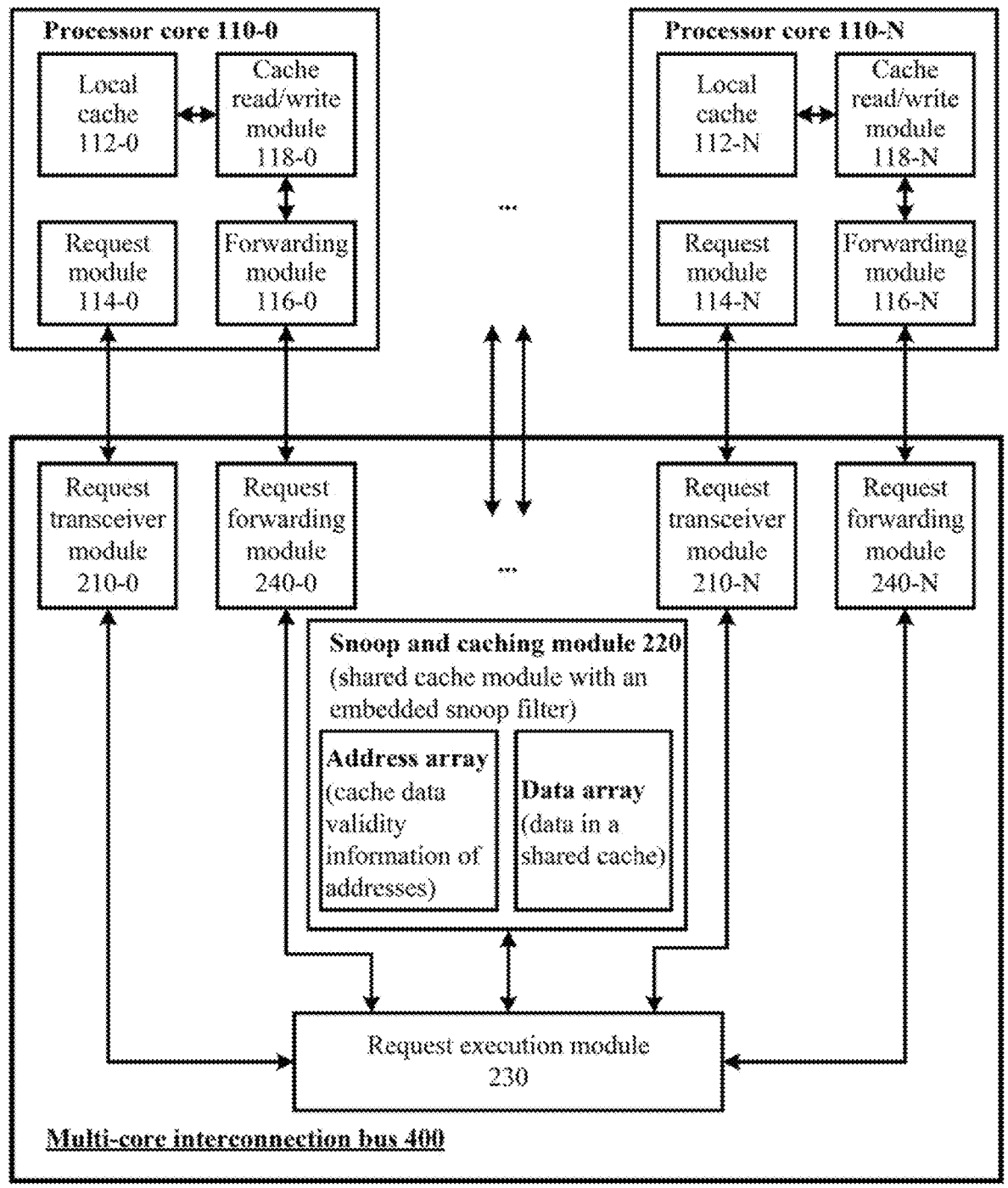
FIG. 3 illustrates a schematic diagram of a multi-core processor according to another embodiment of the present invention.

FIG. 3 illustrates a schematic diagram of a multi-core processor 300 according to another embodiment of the present invention. The multi-core processor 300 shown in FIG. 3 and the multi-core processor 100 shown in FIG. 1 include some identical processing modules, and such identical processing modules are numbered the same in FIG. 1 and FIG. 3.

As shown in FIG. 3, the multi-core processor 300 includes a plurality of processor cores 110 (110-0 to 110-N) and a multi-core interconnection bus 400. The multi-core interconnection bus 400 is coupled to each processor core 110, and is configured to implement inter-core communication between the processor cores.

As shown in FIG. 3, each processor core 110 includes a local cache 112, a request module 114, a forwarding module 116, and a cache read/write module 118.

The request module 114 is coupled to a corresponding request transceiver module 210 in the multi-core interconnection bus 400, and is adapted to send a data request to the request transceiver module 210 and receive response data returned by the request transceiver module 210.

The forwarding module 116 is coupled to a corresponding request forwarding module 240 in the multi-core interconnection bus 400, and is adapted to receive data requests initiated by other processor cores and forwarded by the request forwarding module 240, and control the cache read/write module 118 to perform a read operation on target data in the local cache 112. If the target data is present in the local cache 112, the cache read/write module 118 returns the target data and a validity tag of the target data to the forwarding module 116. If the target data is not present in the local cache 112, the cache read/write module 118 returns data miss information to the forwarding module 116. The forwarding module 116 further returns the received target data and the validity tag of the target data or the data miss information to the multi-core interconnection bus 400 through the request forwarding module 240.

The multi-core interconnection bus 400 includes a plurality of request transceiver modules 210, a snoop and caching module 220, a request execution module 230, and a plurality of request forwarding modules 240.

The request transceiver module 210, the snoop and caching module 220, and the request execution module 230 are the same as those in FIG. 1, and are not described herein again. The request forwarding module 240 is adapted to forward data requests initiated by the other processor cores 110 to a processor core coupled to the request forwarding module 240, and receive data returned by the processor core coupled to the request forwarding module 240.

In this embodiment of the present invention, the request transceiver module 210 is adapted to receive a data request from a processor core, and the data request includes a request address.

After receiving the data request sent by the processor core, the request transceiver module 210 forwards the data request to the request execution module 230, and the request execution module 230 further forwards the data request to the snoop and caching module 220.

According to one embodiment, after receiving the data request from the request transceiver module 210, the request execution module 230 determines whether the request address is a shared address. When the request address is a shared address, the request execution module 230 forwards the data request to the snoop and caching module 220, so that the snoop and caching module 220 returns cache data validity information and data acquired from the shared cache. When the request address is not a shared address, the request execution module 230 accesses a lower-level storage unit coupled to the request execution module 230 to acquire response data, and sends, through the request transceiver module 210, the response data to the processor core that initiates the data request.

When the request address is a shared address, the request execution module 230 forwards the data request to the snoop and caching module 220. The snoop and caching module 220 looks up the cache data validity information of the request address, acquires the data from the shared cache, and sequentially returns the cache data validity information and the data acquired from the shared cache to the request execution module 230.

The cache data validity information is used to determine whether there is valid data stored in the local caches of the processor cores and the shared cache. According to one embodiment, the snoop and caching module 220 stores at least one address array, and the address array stores cache data validity information corresponding to a plurality of addresses. The cache data validity information includes a shared-cache validity bit and a plurality of local-cache validity bits. The shared-cache validity bit is adapted to identify validity of data in the shared cache, and the plurality of local-cache validity bits are adapted to identify validity of data in local caches of the plurality of processor cores. The snoop and caching module 220 is adapted to compare the request address with the addresses in the address array to determine the cache data validity information of the request address.

Further, when the snoop and caching module 220 stores a plurality of address arrays, each address array stores cache data validity information of different addresses. Correspondingly, lookup is performed in each address array to check whether there is the cache data validity information of the request address. If an address array is hit, a lookup process in another address array is terminated to reduce power consumption.

According to one embodiment, the address information may be divided into three parts: a block address (Tag), an index address (Index), and an offset (Offset). For example, for a 32-bit (bit) address, the upper 20 bits are the block address, the middle 6 bits are an index address, and the lower 6 bits are an offset. The present invention does not impose a limitation on a specific division manner of the block address, the index address, and the offset, and the block address, the index address, and the offset may include any quantity of bits.

In the data array of the snoop and caching module, the data is stored in blocks (Block). Correspondingly, what is stored in the address array is cache data validity information of address blocks. Each row in the address array corresponds to cache data validity information of one address block, and the address block is identified based on both a block address Tag and an index address Index. The index address (Index) is used to determine a row of the address array in which the cache data validity information of one address block is located. Both the block address Tag and the cache data validity information are stored in the corresponding row of the address array.

During lookup of the cache data validity information of the request address, the request address is also correspondingly divided into three parts: a block address, an index address, and an offset. A row of the address array in which the cache data validity information of the request address is located is determined by using the index address, and then a block address stored in the row is compared with the block address of the request address to determine whether there is a lookup hit.

If the cache data validity information of the request address is found, the snoop and caching module 220 sends the cache data validity information to the request execution module 230. The request execution module 230 determines, based on the cache data validity information that is received, a target processor core whose local cache stores valid data, forward the data request to the target processor core, and receive data returned by the target processor core. For example, the request execution module 230 may forward the data request to the target processor core through the request forwarding module 240.

If no cache data validity information of the request address is found, the snoop and caching module 220 sends a lookup miss message to the request execution module 230. The request execution module 230 accesses a lower-level storage unit coupled to the request execution module 230 to acquire the response data, and sends, through the request transceiver module 210, the response data to the processor core that initiates the data request.

After sending the cache data validity information of the request address to the request execution module 230, the snoop and caching module 220 further determines, based on the cache data validity information of the request address, whether there is valid data stored in the shared cache. When there is valid data stored in the shared cache, the snoop and caching module 220 acquires the data from the shared cache, and sends the acquired data to the request execution module 230.

Referring to the foregoing description, the snoop and caching module 220 in the present invention uses a two-stage returning mechanism for returning information to the request execution module 230. For first-stage returning, the snoop and caching module 220 returns the cache data validity information of the request address to the request execution module 230, so that the request execution module 230 can determine, based on the cache data validity information, the target processor core whose local cache stores valid data, and immediately forward the data request to the target processor core. For second-stage returning, the snoop and caching module 220 returns data of the shared cache to the request execution module 230. Based on the two-stage returning mechanism, a process of forwarding the data request to the target processor core by the request execution module 230 to access the local cache of the target processor core can be performed in parallel with a process of accessing the shared cache by the snoop and caching module 220. Considering that the data array usually requires a large storage space and has a longer access latency than the address array, returning an access result of the address array to the request execution module 230 at a higher speed can increase a responding speed. Compared with the prior-art technical solution of first accessing the local cache and then accessing the shared cache, an access latency is greatly reduced and the speed of inter-core data communication is improved in the present invention.

Figure 4:
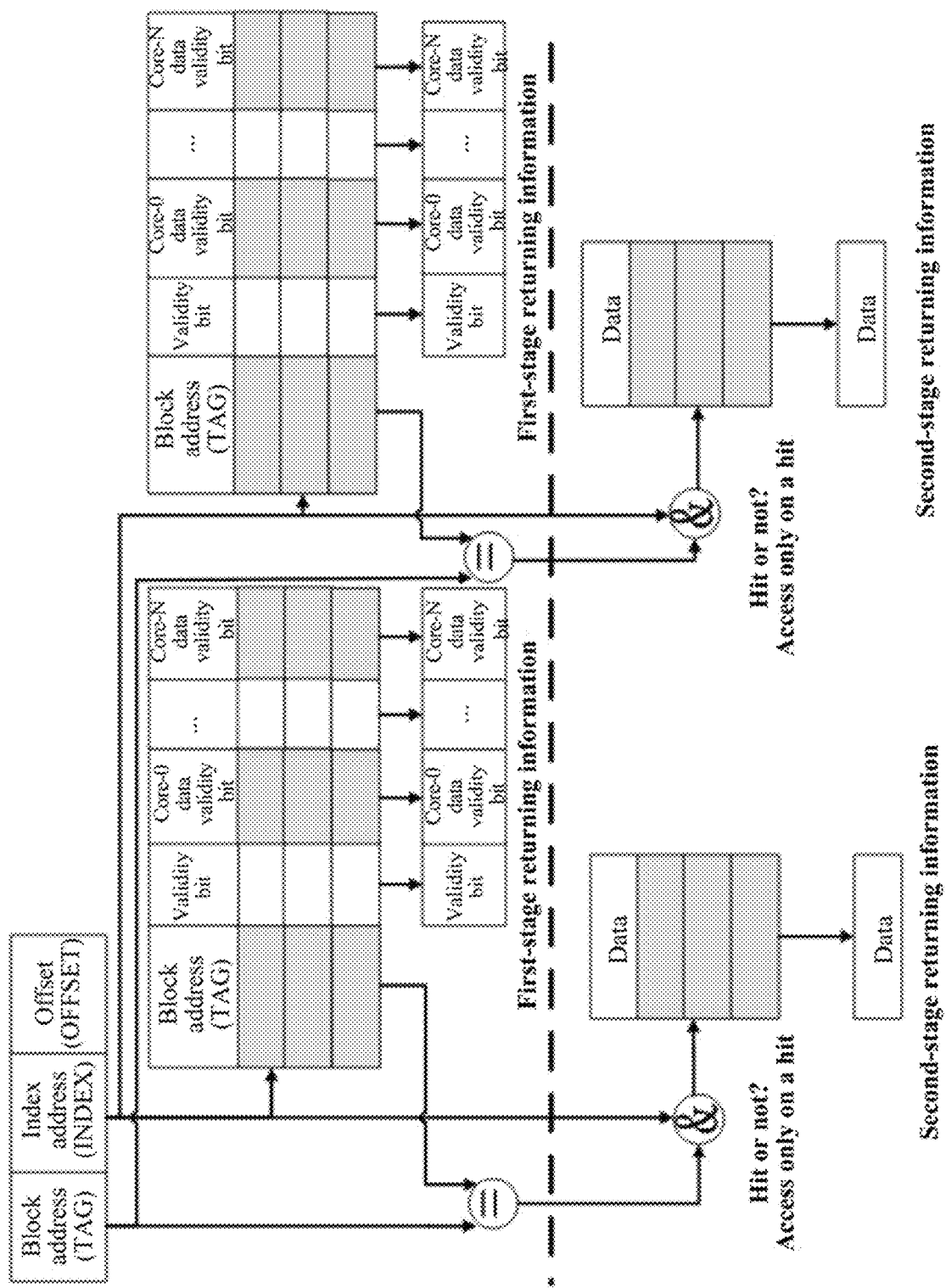
FIG. 4 illustrates a schematic diagram of a two-stage returning process of a snoop and caching module according to one embodiment of the present invention.

FIG. 4 illustrates a process of returning information to a request execution module 230 by a snoop and caching module 220 according to one embodiment of the present invention. The process more clearly illustrates a two-stage returning mechanism of the present invention.

As shown in FIG. 4, the snoop and caching module 220 includes two address arrays and two data arrays. Each row of the address array stores cache data validity information of one address block. The cache data validity information includes a shared-cache validity bit (that is, a "validity bit" column in the address array shown in FIG. 4) and a plurality of local-cache validity bits (that is, "core-0 data validity bit" to "core-N data validity bit" columns in the address array shown in FIG. 4). The address block is jointly identified by a block address and an index address.

As shown in the upper left corner of FIG. 4, same as the address array, the request address is also divided into three parts, namely, a block address TAG, an index address INDEX, and an offset OFFSET. The snoop and caching module 220 first determines, based on the index address INDEX, a row of the address array in which the cache data validity information of the request address is located. The index address INDEX is a row number of the address array. After determining the row number, the snoop and caching module 220 determines whether the block address stored in the row is the same as the block address TAG of the request address. If the same, there is a lookup hit and the cache data validity information stored in the row, namely (shared-cache) validity bit and core-0 data validity bit to core-N data validity bit, is returned to the request execution module 230. This is the first-stage returning. After receiving the cache data validity information sent by the snoop and caching module 220, the request execution module 230 determines, based on the cache data validity information, a target processor core whose local cache stores valid data, and forwards the data request to the target processor core to acquire the data in the local cache of the target processor core.

After sending the cache data validity information of the request address to the request execution module 230, the snoop and caching module 220 determines, based on the shared-cache validity bit, whether there is valid data stored in the shared cache, that is, determining whether the data in the shared cache is hit. When there is valid data stored in the shared cache, the snoop and caching module 220 acquires the data from the shared cache, and sends the acquired data to the request execution module 230. This is the second-stage returning.

It should be noted that, although in the embodiment shown in FIG. 4, the address array and the data array are implemented as two separate lists, it can be understood by those skilled in the art that the address array and the data array may alternatively be implemented as the same list, for example, the data array in FIG. 4 may be combined into a right side of the address array, so that each row of the address array includes block address (TAG), validity bit, core-0 data validity bit to core-N data validity bit, and data.

Based on the first-stage returning of the snoop and caching module 220, the request execution module 230 immediately forwards the data request to the target processor core, and then the request execution module 230 receives the data returned by the target processor core. Based on the second-stage returning of the snoop and caching module 220, the request execution module 230 receives the data acquired from the shared cache and returned by the snoop and caching module 220. That is, the request execution module 230 is adapted to receive the data returned by the target processor core and the data acquired from the shared cache and returned by the snoop and caching module. The request execution module 230 determines response data based on the received data, and returns, through the request transceiver module 210, the response data to the processor core that initiates the data request. In this way, the response to the data request is completed.

The data returned by the target processor core includes the data itself and a validity tag of the data. Correspondingly, the request execution module 230 receives the data and the validity tag of the data that are returned by the target processor core. When the received data that is returned by the target processor core is valid, the request execution module 230 uses the valid data as the response data, and returns, through the request transceiver module 210, the response data to the processor core that initiates the data request. It should be noted that valid data may be stored in local caches of a plurality of target processor cores. In this case, once receiving the valid data returned by the target processor core, the request execution module 230 immediately uses the valid data as the response data, and returns the response data to the processor core that initiates the data request. In this way, the response to the data request is completed and information returned by other target processor cores and received later may be discarded.

If the data returned by all the target processor cores is invalid, the request execution module 230 uses the data acquired from the shared cache as the response data, and returns, through the request transceiver module 210, the response data to the processor core that initiates the data request.

It should be noted that, because data is stored in blocks in the cache, the data returned by the processor core and the snoop and caching module 220 to the request execution module 230 is data of the address block that is identified by the block address Tag and the index address Index in the request address, but not data specific to a complete request address. Correspondingly, the response data determined by the request execution module 230 is also the data of the address block that is identified by the block address Tag and the index address Index. The request execution module 230 may return the data of the entire address block to the processor core that initiates the data request. The processor core may find data of a specific offset (Offset) from the returned data of the address block, and may retain or discard other data in the address block. In some other embodiments, the request execution module 230 may alternatively find data of a specific offset (Offset) from the address block, and then return the data of the specific offset to the processor core that initiates the data request, and may retain or discard other data in the address block.

The foregoing describes the two-stage returning mechanism of the present invention by using an example in which there is valid data stored in the shared cache. When there is no valid data stored in the shared cache, the snoop and caching module 220 no longer accesses the shared cache. Correspondingly, the second-stage returning process (that is, returning the data acquired from the shared cache to the request execution module 230) is omitted. In this case, the request execution module 230 receives the data and the validity tag of the data that are returned by the target processor core; and when the received data that is returned by the target processor core is valid, uses the valid data as the response data and returns, through the request transceiver module 210, the response data to the processor core that initiates the data request. If the data returned by all the target processor cores is invalid, the request execution module 230 acquires response data from a lower-level storage unit coupled to the request execution module 230, and returns, through the request transceiver module 210, the response data to the processor core that initiates the data request.

According to one embodiment, if the cache data validity information stored in the snoop and caching module 220 is consistent with current real data validity tags of the processor cores, that is, if the cache data validity information indicates that valid data is stored in a local cache of a processor core, the local cache of the processor core surely stores the valid data, and the two-stage returning process may be reduced to the following one-stage returning process.

When the cache data validity information indicates that there is at least one target processor core whose local cache stores valid data, the snoop and caching module 220 sends the data validity information to the request execution module 230, so that the request execution module 230 determines the target processor core whose local cache stores the valid data, and forwards the data request to the target processor core. In addition, the snoop and caching module 220 does not access the shared cache, that is, does not need to return the data acquired from the shared cache to the request execution module 230. Therefore, the foregoing second-stage returning is omitted. The request execution module 230 uses the data returned by the target processor core as the response data, and returns, through the request transceiver module 210, the response data to the processor core that initiates the data request.

When the cache data validity information indicates that there is no valid data in any local caches of the processor cores and there is valid data in the shared cache, the snoop and caching module 220 acquires the data from the shared cache, and send the acquired data to the request execution module 230. The snoop and caching module 220 does not need to return the cache data validity information to the request execution module 230, and therefore the first-stage returning is omitted. The request execution module 230 uses the data returned by the snoop and caching module 220 as the response data, and returns, through the request transceiver module 210, the response data to the processor core that initiates the data request.

Figure 5:
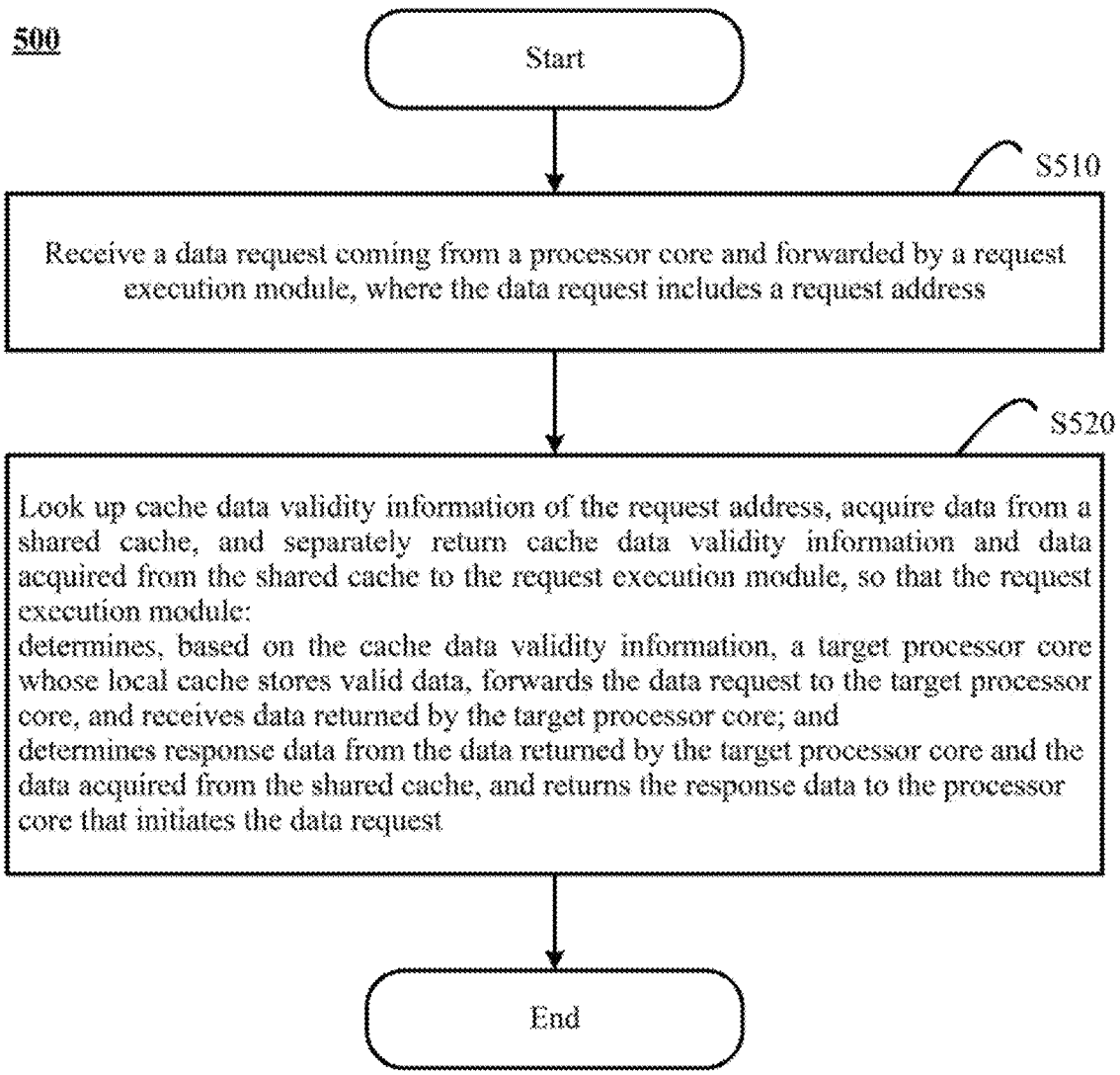
FIG. 5 illustrates a flowchart of an inter-core communication method according to one embodiment of the present invention.

FIG. 5 illustrates a flowchart of an inter-core communication method 500 according to one embodiment of the present invention. The method 500 is executed in a snoop and caching module 220 of a multi-core interconnection bus. As shown in FIG. 5, the method 500 starts from step S510.

In step S510, a data request coming from a processor core and forwarded by a request execution module is received. The data request includes a request address.

When a processor core of a multi-core processor initiates a data request, a request transceiver module 210 of the multi-core interconnection bus receives the data request and forwards the data request to the request execution module 230. The request execution module 230 determines whether the request address is a shared address. When the request address is a shared address, the request execution module 230 forwards the data request to the snoop and caching module 220. Correspondingly, the snoop and caching module 220 executes step S510 of receiving the data request from the request execution module 230.

When the request address is not a shared address, step S510 is no longer performed, and the request execution module 230 accesses a lower-level storage unit coupled to the request execution module 230 to acquire response data, and sends, through the request transceiver module 210, the response data to the processor core that initiates the data request.

Then, in step S520, looking up cache data validity information of the request address is performed, data is acquired from the shared cache, and the cache data validity information and the data acquired from the shared cache are sequentially returned to the request execution module, so that the request execution module determines, based on the cache data validity information, a target processor core whose local cache stores valid data, forwards the data request to the target processor core, receives data returned by the target processor core, determines the response data from the data returned by the target processor core and the data acquired from the shared cache, and returns the response data to the processor core that initiates the data request.

The cache data validity information is used to determine whether there is valid data stored in local caches of processor cores and the shared cache. According to one embodiment, the snoop and caching module 220 stores at least one address array, and the address array stores cache data validity information corresponding to a plurality of addresses. The cache data validity information includes a shared-cache validity bit and a plurality of local-cache validity bits. The shared-cache validity bit is adapted to identify validity of data in the shared cache, and the plurality of local-cache validity bits are adapted to identify validity of data in local caches of a plurality of processor cores. The snoop and caching module 220 is adapted to compare the request address with the addresses in the address array to determine the cache data validity information of the request address.

When the cache data validity information of the request address is found in step S520, the cache data validity information is returned to the request execution module 230. When the cache data validity information for the request address is not found in step S520, a lookup miss message is returned to the request execution module 230, so that the request execution module 230 accesses the lower storage unit coupled to the request execution module 230 to acquire the response data, and sends, through the request transceiver module 210, the response data to the processor core that initiates the data request.

In step S520, the snoop and caching module 220 returns the cache data validity information to the request execution module 230, and the request execution module 230 determines, based on the cache data validity information, the target processor core whose local cache stores the valid data, forwards the data request to the target processor core, and receives data returned by the target processor core.

Then, the snoop and caching module 220 determines, based on the cache data validity information, whether there is valid data stored in the shared cache; when there is valid data stored in the shared cache, acquires the data from the shared cache, and returns the acquired data to the request execution module 230, so that the request execution module receives the data returned by the target processor core and the data acquired from the shared cache, determines the response data based on the received data, and returns the response data to the processor core that initiates the data request.

The step of returning the cache data validity information to the request execution module 230 by the snoop and caching module 220 corresponds to the first-stage returning of the two-stage returning mechanism in the present invention. For the first-stage returning, the snoop and caching module 220 returns the cache data validity information to the request execution module 230, and the request execution module 230 determines, based on the cache data validity information, the target processor core whose local cache stores the valid data, and immediately forwards the data request to the target processor core.

The step of returning the data of the shared cache to the request execution module 230 by the snoop and caching module 220 corresponds to the second-stage returning of the two-stage returning mechanism in the present invention. For the second-stage returning, the snoop and caching module 220 returns the data of the shared cache to the request execution module 230. Based on the two-stage returning mechanism, a process of forwarding the data request to the target processor core by the request execution module 230 to access the local cache of the target processor core can be performed in parallel with a process of accessing the shared cache by the snoop and caching module 220. Considering that the data array usually requires a large storage space and has a longer access latency than the address array, returning an access result of the address array to the request execution module 230 at a higher speed can increase a responding speed. Compared with the prior-art technical solution of first accessing the local cache and then accessing the shared cache, an access latency is greatly reduced and the speed of inter-core data communication is improved in the present invention.

Based on the first-stage returning of the snoop and caching module 220, the request execution module 230 immediately forwards the data request to the target processor core, and then the request execution module 230 receives the data returned by the target processor core. Based on the second-stage returning of the snoop and caching module 220, the request execution module 230 receives the data acquired from the shared cache and returned by the snoop and caching module 220. That is, the request execution module 230 is adapted to receive the data returned by the target processor core and the data acquired from the shared cache and returned by the snoop and caching module. The request execution module 230 determines response data based on the received data, and returns, through the request transceiver module 210, the response data to the processor core that initiates the data request. In this way, the response to the data request is completed.

The data returned by the target processor core includes the data itself and a validity tag of the data. Correspondingly, the request execution module 230 receives the data and the validity tag of the data that are returned by the target processor core. When the received data that is returned by the target processor core is valid, the request execution module 230 uses the valid data as the response data, and returns, through the request transceiver module 210, the response data to the processor core that initiates the data request. It should be noted that valid data may be stored in local caches of a plurality of target processor cores. In this case, once receiving the valid data returned by the target processor core, the request execution module 230 immediately uses the valid data as the response data, and returns the response data to the processor core that initiates the data request. In this way, the response to the data request is completed and information returned by other target processor cores and received later may be discarded.

If the data returned by all the target processor cores is invalid, the request execution module 230 uses the data acquired from the shared cache as the response data, and returns, through the request transceiver module 210, the response data to the processor core that initiates the data request.

The foregoing describes the two-stage returning mechanism of the present invention by using an example in which there is valid data stored in the shared cache. If it is found in step S520 that there is no valid data stored in the shared cache, the snoop and caching module 220 no longer accesses the shared cache. Correspondingly, the second-stage returning process in the foregoing step S520 is omitted. In this case, the request execution module 230 receives the data and the validity tag of the data that are returned by the target processor core; and when the received data that is returned by the target processor core is valid, uses the valid data as the response data and returns, through the request transceiver module 210, the response data to the processor core that initiates the data request. If the data returned by all the target processor cores is invalid, the request execution module 230 acquires response data from a lower-level storage unit coupled to the request execution module 230, and returns, through the request transceiver module 210, the response data to the processor core that initiates the data request.

According to one embodiment, if the cache data validity information stored in the snoop and caching module 220 is consistent with current real data validity tags of the processor cores, that is, if the cache data validity information indicates that valid data is stored in a local cache of a processor core, the local cache of the processor core surely stores the valid data, and the two-stage returning process shown in step S520 may be reduced to the following one-stage returning process.

When the cache data validity information indicates that there is at least one target processor core whose local cache stores valid data, the snoop and caching module 220 sends the data validity information to the request execution module 230, so that the request execution module 230 determines the target processor core whose local cache stores the valid data, and forwards the data request to the target processor core. In addition, the snoop and caching module 220 does not access the shared cache, that is, does not need to return the data acquired from the shared cache to the request execution module 230. Therefore, the second-stage returning is omitted. The request execution module 230 uses the data returned by the target processor core as the response data, and returns, through the request transceiver module 210, the response data to the processor core that initiates the data request.

When the cache data validity information indicates that there is no valid data in any local caches of the processor cores and there is valid data in the shared cache, the snoop and caching module 220 acquires the data from the shared cache, and send the acquired data to the request execution module 230. The snoop and caching module 220 does not need to return the cache data validity information to the request execution module 230, and therefore the first-stage returning is omitted. The request execution module 230 uses the data returned by the snoop and caching module 220 as the response data, and returns, through the request transceiver module 210, the response data to the processor core that initiates the data request.

Figure 6:
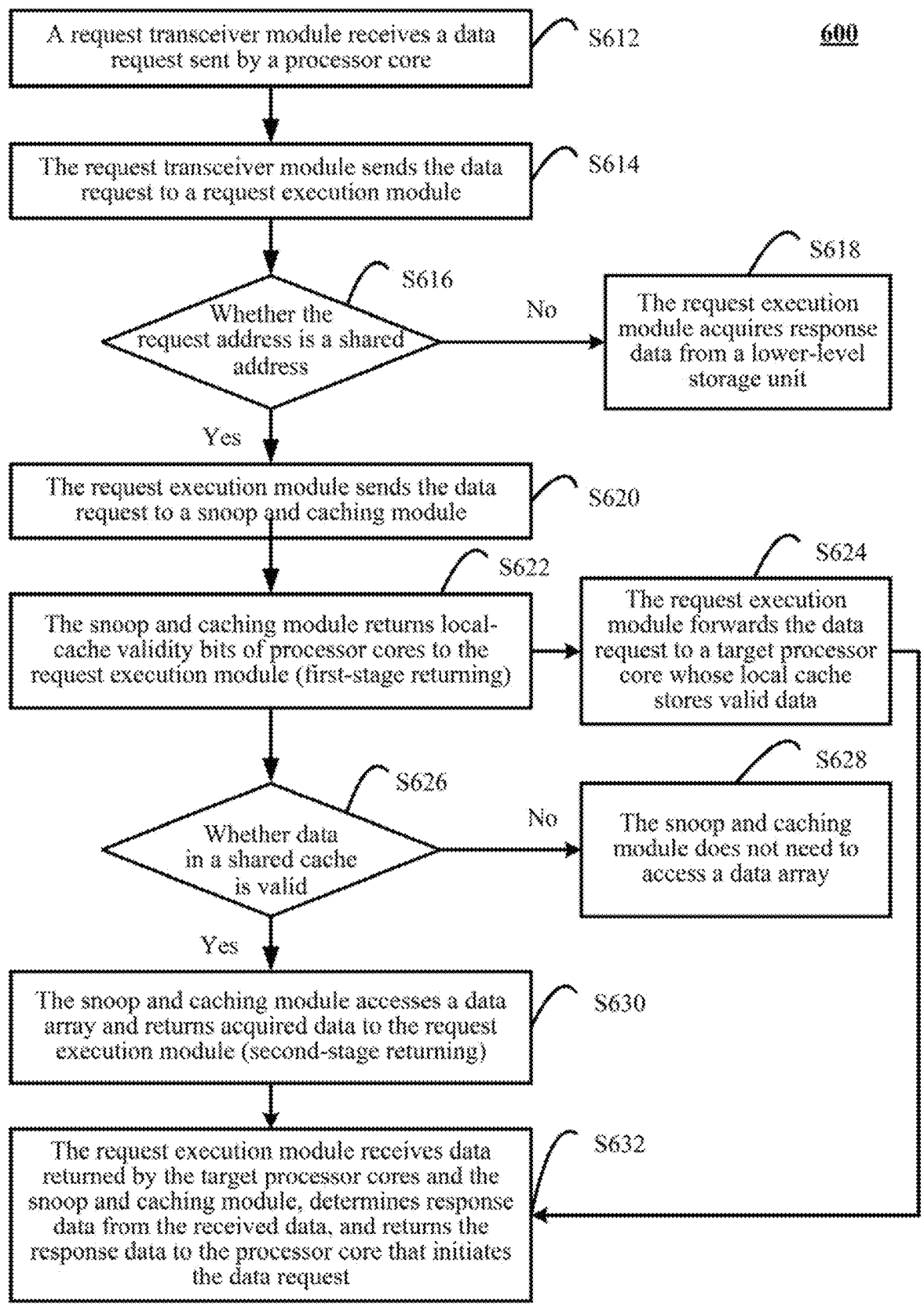
FIG. 6 illustrates a flowchart of an inter-core communication process according to one embodiment of the present invention.

FIG. 6 illustrates a flowchart of an inter-core communication process 600 according to one embodiment of the present invention.

In step S612, a request transceiver module receives a data request from a processor core. For example, referring to FIG. 1 and FIG. 3, a request transceiver module 210-0 is adapted to receive a data request from a processor core 110-0. The data request includes a request address.

Then, in step S614, the request transceiver module 210-0 sends the data request to a request execution module 230.

Subsequently, in step S616, the request execution module 230 determines whether the request address is a shared address. If the request address is a shared address, step S620 is performed: The request execution module 230 sends the data request to a snoop and caching module 220. If the request address is not a shared address, step S618 is performed: The request execution module 230 acquires response data from a lower-level storage unit, and returns the response data to the processor core 110-0 through the request transceiver module 210-0.

After step S620, step S622 is performed. In step S622, the snoop and caching module 220 looks up cache data validity information of the request address in an address array. The cache data validity information includes a shared-cache validity bit used for indicating data validity of a shared cache and local-cache validity bits used for indicating data validity of local caches. The snoop and caching module 220 returns the cache data validity information of the request address, that is, local-cache validity bits corresponding to processor cores, to the request execution module 230. This is the first-stage returning.

Then, in step S624, the request execution module 230 determines, based on the cache data validity information returned by the snoop and caching module 220, a target processor core whose local cache stores valid data, and forwards the data request to the target processor core.

Step S626 and step S624 are performed in parallel. In step S626, the snoop and caching module 220 determines, based on the shared-cache validity bit, whether data in the shared cache is valid. If the data in the shared cache is valid, step S630 is performed. If the data in the shared cache is invalid, step S628 is performed, and the snoop and caching module 220 does not need to access a data array, that is, does not need to acquire the data from the shared cache.

In step S630, the snoop and caching module 220 accesses the data array to acquire the data that is stored in the shared cache and corresponding to the request address, and returns the acquired data to the request execution module 230. This is the second-stage returning.

Then, in step S632, the request execution module 230 receives the data returned by the target processor cores and the snoop and caching module 220, determines the response data from the received data, and returns, through the request transceiver module 210-0, the response data to the processor core 110-0 that initiates the data request.

The data returned by the target processor core includes the data itself and a validity tag of the data. Correspondingly, the request execution module 230 receives the data and the validity tag of the data that are returned by the target processor core. When the received data that is returned by the target processor core is valid, the request execution module 230 uses the valid data as the response data, and returns, through the request transceiver module 210, the response data to the processor core that initiates the data request.

If the data returned by all the target processor cores is invalid, the request execution module 230 uses the data acquired from the shared cache as the response data, and returns, through the request transceiver module 210, the response data to the processor core that initiates the data request.

In a case in which there is no need to access the data array shown in step S628, in step S632, the request execution module 230 receives only the data and the validity tag of the data that are returned by the target processor core. When the received data that is returned by the target processor core is valid, the request execution module 230 uses the valid data as the response data, and returns, through the request transceiver module 210, the response data to the processor core that initiates the data request. If the data returned by all the target processor cores is invalid, the request execution module 230 acquires response data from a lower-level storage unit coupled to the request execution module 230, and returns, through the request transceiver module 210, the response data to the processor core that initiates the data request.

Figure 7:
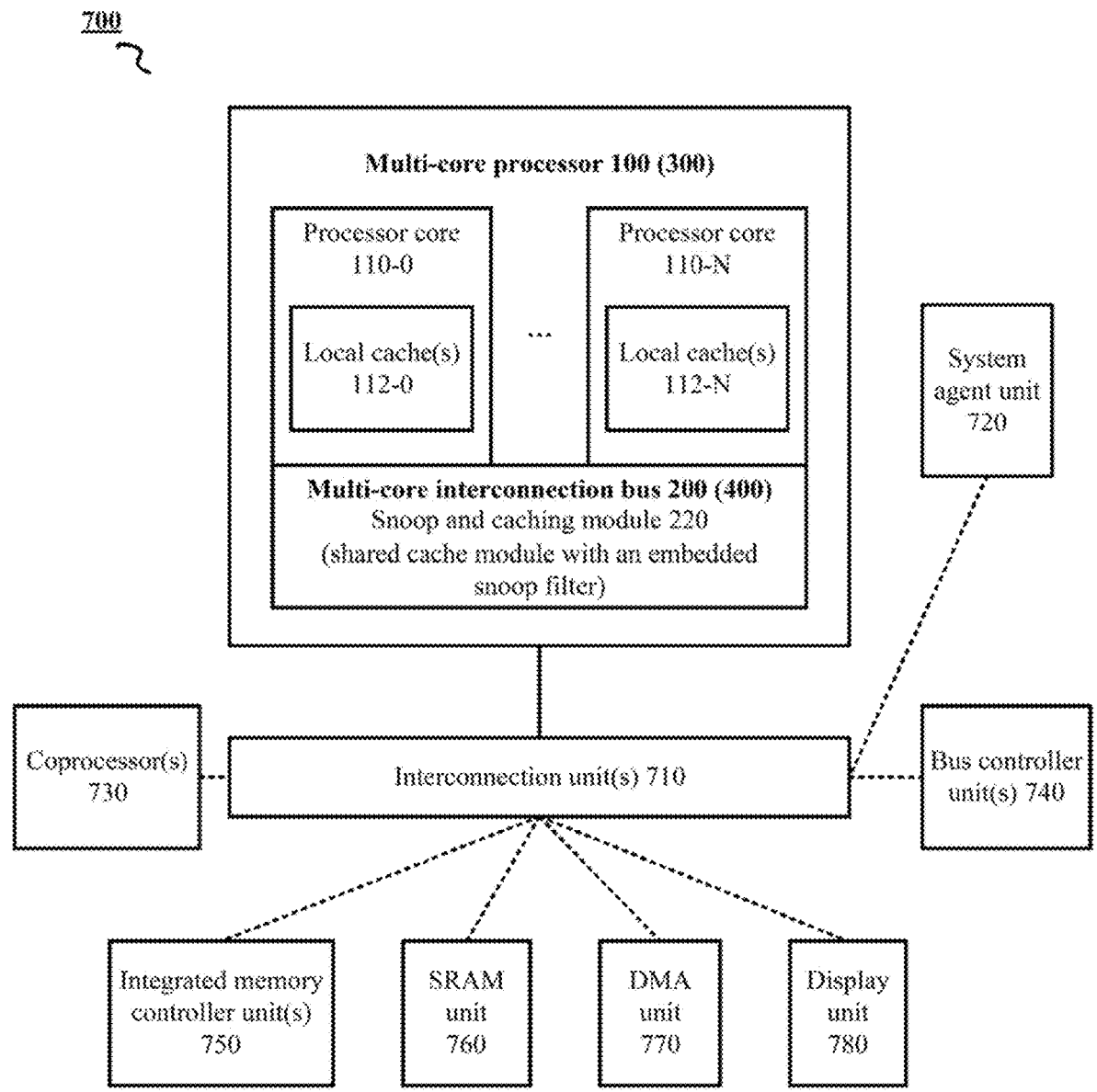
FIG. 7 illustrates a schematic diagram of a system-on-chip according to one embodiment of the present invention.

FIG. 7 illustrates a schematic diagram of a system-on-chip (SoC) 700 according to one embodiment of the present invention. The system-on-chip shown in FIG. 7 includes the multi-core processor 100 shown in FIG. 1 or the multi-core processor 300 shown in FIG. 3, and therefore components shown in FIG. 1 and FIG. 3 have the same reference numerals. As shown in FIG. 7, an interconnection unit 710 is coupled to the multi-core processor 100 (300), a system agent unit 720, one or more coprocessors 730, one or more bus controller units 740, one or more integrated memory controller units 750, a static random access memory (SRAM) unit 760, a direct memory access (DMA) unit 770, and a display unit 780 used for coupling to one or more external displays.

The multi-core processor 100 (300) includes a plurality of processor cores 110-0 to 110-N and the multi-core interconnection bus 200 (400) in the present invention.

The system agent unit 720 includes these components that coordinate and operate the processor cores 110-0 to 110-N. The system agent unit 720 may include, but is not limited to, for example, a power control unit (PCU). The PCU may include logic and components required for adjusting power states of the processor cores 110-0 to 110-N and an integrated graphics logic.

The coprocessor 730 includes an integrated graphics logic, an image processor, an audio processor, and a video processor. In one embodiment, the coprocessor 730 is a dedicated processor, for example, a network or communication processor, a compression engine, a GPGPU, a high-throughput MIC processor, or an embedded processor.

The system-on-chip described above may be included in an intelligent device to implement corresponding functions in the intelligent device, including but not limited to executing related control programs, data analysis, computing and processing, network communication, controlling peripherals of the intelligent device, and so on.

Such intelligent devices include dedicated intelligent devices such as mobile terminals and personal digital terminals. The devices include one or more system-on-chips of the present invention to perform data processing or control peripherals of the device.

Such intelligent devices also include dedicated devices designed for specific functions, for example, smart speakers and smart display devices. These devices include the system-on-chip of the present invention to control a speaker or a display device, so as to provide the speaker or the display device with additional functions of communication, perception, data processing, and the like.

Such intelligent devices also include various IoT and AIoT devices. These devices include the system-on-chip of the present invention to perform data processing, for example, AI computing or data communication and transmission, thereby implementing denser and more intelligent device distribution.

Such intelligent devices may also be used in a vehicle, for example, may be implemented as a vehicle-mounted device or may be built into the vehicle, so as to provide a data-processing capability for intelligent driving of the vehicle.

Such intelligent devices may also be used in the home and entertainment field, for example, may be implemented as a smart speaker, a smart air conditioner, a smart refrigerator, a smart display device, or the like. These devices include the system-on-chip of the present invention to perform data processing and peripheral control, making home and entertainment devices intelligent.

In addition, such intelligent devices may also be used in the industrial field, for example, may be implemented as an industrial control device, a sensing device, an IoT device, an AIoT device, a braking device, or the like. These devices include the system-on-chip of the present invention to perform data processing and peripheral control, making industrial equipment intelligent.

The foregoing description of intelligent devices is merely exemplary, and the intelligent device according to the present invention is not limited thereto. All intelligent devices capable of performing data processing by using the system-on-chip of the present invention fall within the protection scope of the present invention.

All the embodiments of the mechanisms disclosed herein may be implemented in hardware, software, firmware, or a combination thereof. The embodiments of the present invention may be implemented as computer programs or program code executed on a programmable system. The programmable system includes at least one processor, a storage system (including volatile and non-volatile memories and/or storage elements), at least one input device, and at least one output device.

It should be understood that, for the purpose of streamlining the present disclosure and aiding in the understanding of one or more of the inventive aspects, in the foregoing description of the exemplary embodiments of the present invention, various features of the present invention are sometimes grouped together into a single embodiment, diagram, or description thereof. However, the disclosed method is not to be interpreted as reflecting an intention that the claimed invention requires more features than those expressly recited in each claim. Rather, as the following claims reflect, inventive aspects lie in less than all features of a single embodiment disclosed above. Therefore, the claims following the detailed description are hereby expressly incorporated into this detailed description, with each claim standing on its own as a separate embodiment of the present invention.

Those skilled in the art should understand that the modules, units or components of the devices in the examples disclosed herein may be arranged in the devices described in the embodiments, or alternatively located in one or more devices different from the devices in the examples. The modules described in the foregoing examples may be combined into one module or may be divided into a plurality of submodules.

Those skilled in the art can understand that the modules in the devices in the embodiments may be adaptively changed and provided in one or more devices different from the devices in the embodiments. The modules, units or components in the embodiments may be combined into one module, unit or component, and in addition, they may be divided into a plurality of submodules, subunits or subcomponents. All features disclosed in the description (including the accompanying claims, abstract and drawings), and all processes or units of any methods or devices so disclosed, may be combined in any way, except that at least some of such features and/or processes or units are mutually exclusive. Unless otherwise clearly stated, each feature disclosed in the description (including the accompanying claims, abstract and drawings) may be replaced by alternative features serving the same, equivalent or similar purpose.

In addition, those skilled in the art can understand that, although some of the embodiments described herein include some but not other features included in other embodiments, combinations of features of different embodiments are meant to be within the scope of the present invention and form different embodiments. For example, in the following claims, any one of the claimed embodiments may be used in any combination.

In addition, some of the embodiments are described herein as a combination of methods or method elements that can be implemented by a processor of a computer system or by other devices that execute the functions. Therefore, a processor having necessary instructions for implementing the methods or method elements forms a device for implementing the methods or method elements. In addition, the elements described in the device embodiments are examples of devices for implementing functions executed by elements for the purpose of implementing the present invention.

As used herein, unless otherwise specified, the use of ordinals "first", "second", "third", and the like to describe general objects merely represents different instances involving similar objects, and is not intended to imply that objects so described must have a given order in time, space, sorting or any other aspects.

Although the present invention has been described according to a limited quantity of embodiments, benefiting from the foregoing description, those skilled in the art can understand that other embodiments may be conceived of within the scope of the present invention described thereby. In addition, it should be noted that the language used in the specification is mainly selected for readability and teaching purposes, rather than for interpreting or defining the subject of the present invention. Therefore, many modifications and variations made without departing from the scope and spirit of the appended claims are apparent to persons of ordinary skill in the art. In regard to the scope of the present invention, the disclosure of the present invention is descriptive rather than restrictive, and the scope of the present invention should be defined by the appended claims.

What is claimed is:

1. A multi-core interconnection bus, comprising:
a request transceiver module coupled to a processor core and a request execution module, and adapted to receive a data request from the processor core and forward the data request to a snoop and caching module through the request execution module, wherein the data request comprises a request address;
the snoop and caching module adapted to look up cache data validity information of the request address, acquire data from a shared cache, and sequentially return the cache data validity information and the data acquired from the shared cache to the request execution module; and
the request execution module adapted to determine, based on the cache data validity information, a target processor core whose local cache stores valid data, forward the data request to the target processor core, receive data returned by the target processor core; and to determine response data from the data returned by the target processor core and that returned by the snoop and caching module, and return, through the request transceiver module, the response data to the processor core that initiates the data request.

2. The multi-core interconnection bus according to claim 1, wherein the request execution module is further adapted to:
determine whether the request address is a shared address; and
when the request address is a shared address, forward the data request to the snoop and caching module; and
when the request address is not a shared address, access a lower-level storage unit coupled to the request execution module to acquire the response data.

3. The multi-core interconnection bus according to claim 1, wherein the cache data validity information is adapted to determine whether there is valid data stored in local caches of processor cores and the shared cache.

4. The multi-core interconnection bus according to claim 1, wherein the cache data validity information comprises a shared-cache validity bit and a plurality of local-cache validity bits;
the shared-cache validity bit is adapted to identify validity of data in the shared cache; and
the plurality of local-cache validity bits are adapted to identify validity of data in local caches of a plurality of processor cores.

5. The multi-core interconnection bus according to claim 1, wherein the snoop and caching module stores at least one address array, and the at least one address array comprises cache data validity information corresponding to a plurality of addresses; and
the snoop and caching module is further adapted to:
compare the request address with addresses in the at least one address array, to determine the cache data validity information of the request address.

6. The multi-core interconnection bus according to claim 1, wherein the snoop and caching module is further adapted to:
when the cache data validity information of the request address is not found, return a lookup miss message to the request execution module, so that the request execution module accesses the lower-level storage unit coupled to the request execution module to acquire the response data.

7. The multi-core interconnection bus according to claim 1, wherein the snoop and caching module is further adapted to:
determine, based on the cache data validity information, whether there is valid data stored in the shared cache; and
when there is valid data stored in the shared cache, acquire the data from the shared cache and return the acquired data to the request execution module.

8. The multi-core interconnection bus according to claim 1, wherein the request execution module is further adapted to:
receive the data returned by the target processor core and a validity tag of the data; and
when the received data returned by the target processor core is valid, use the valid data as the response data.

9. The multi-core interconnection bus according to claim 8, wherein the request execution module is further adapted to:
when data returned by all target processor cores is invalid, use the data returned by the snoop and caching module as the response data.

10. The multi-core interconnection bus according to claim 1, wherein the snoop and caching module is further adapted to:
skip access to the shared cache when there is no valid data stored in the shared cache.

11. The multi-core interconnection bus according to claim 10, wherein the request execution module is further adapted to:
if data returned by all target processor cores is invalid, access a lower-level storage unit coupled to the request execution module to acquire the response data.

12. The multi-core interconnection bus according to claim 1, wherein when the cache data validity information stored in the snoop and caching module is consistent with current real data validity tags of processor cores, the snoop and caching module is further adapted to:
when the cache data validity information indicates that there is at least one target processor core whose local cache stores valid data, send the cache data validity information to the request execution module, so that the request execution module determines a target processor core whose local cache stores valid data, and forwards the data request to the target processor core; and skip access to the shared cache; and
the request execution module is further adapted to use the data returned by the target processor core as the response data.

13. The multi-core interconnection bus according to claim 12, wherein
the snoop and caching module is further adapted to:
when the cache data validity information indicates that there is no valid data in any local caches of the processor cores and there is valid data stored in the shared cache, acquire the data from the shared cache and send the acquired data to the request execution module; and
the request execution module is further adapted to use the data returned by the snoop and caching module as the response data.

14. A multi-core processor, comprising:
a plurality of processor cores; and
the multi-core interconnection bus according to claim 1.

15. A system-on-chip, comprising the multi-core processor according to claim 14.

16. An intelligent device, comprising the system-on-chip according to claim 15.

17. An inter-core communication method, comprising the following steps:
   receiving a data request coming from a processor core and forwarded by a request execution module, wherein the data request comprises a request address; and
   looking up cache data validity information of the request address, acquiring data from a shared cache, and sequentially returning the cache data validity information and the data acquired from the shared cache to the request execution module, so that the request execution module:
   determines, based on the cache data validity information, a target processor core whose local cache stores valid data, forwards the data request to the target processor core, receives data returned by the target processor core, determines response data from the data returned by the target processor core and the data acquired from the shared cache, and returns the response data to the processor core that initiates the data request.

18. The method according to claim 17, further comprising the following step:
   when the request address is a shared address, performing the step of receiving a request address sent by the request execution module; and
   when the request address is not a shared address, skipping the step of receiving a request address sent by the request execution module, and accessing, by the request execution module, a lower-level storage unit coupled to the request execution module to acquire the response data.

19. The method according to claim 17, wherein the cache data validity information is adapted to determine whether there is valid data stored in local caches of processor cores and the shared cache.

20. The method according to claim 17, wherein the cache data validity information comprises a shared-cache validity bit and a plurality of local-cache validity bits;
   the shared-cache validity bit is adapted to identify validity of data in the shared cache; and
   the plurality of local-cache validity bits are adapted to identify validity of data in local caches of a plurality of processor cores.

* * * * *